United States Patent [19]

Robertson

[11] 4,294,484
[45] Oct. 13, 1981

[54] VEHICLE CAMPER

[75] Inventor: Robert H. Robertson, Dallas, Tex.

[73] Assignee: Ronbil Industries, Inc., Dallas, Tex.

[21] Appl. No.: 18,888

[22] Filed: Mar. 9, 1979

[51] Int. Cl.³ .............................................. B60P 3/32
[52] U.S. Cl. .................................. 296/156; 135/1 A; 135/3 A; 296/164; 296/174; 296/176
[58] Field of Search ............... 296/156, 160, 164, 174, 296/176, 10, 100; 135/1 A, 3 A, 5 A

[56] References Cited

U.S. PATENT DOCUMENTS

| | | | |
|---|---|---|---|
| 1,527,105 | 2/1925 | Zagelmeyer | 296/164 |
| 1,864,047 | 6/1932 | Lawhorne | 296/169 |
| 2,688,289 | 9/1954 | Sterling | 105/369 |
| 2,984,515 | 5/1961 | Hocks | 296/23 |
| 3,241,501 | 3/1966 | Watts | 105/369 |
| 3,351,356 | 11/1967 | Clark | 280/179 |
| 3,466,082 | 9/1969 | Branch | 296/164 |
| 3,489,456 | 1/1970 | Klanke | 296/100 |
| 3,524,673 | 8/1970 | Cramer | 296/156 |
| 3,704,039 | 11/1972 | Dean | 296/137 B |
| 3,713,687 | 1/1973 | Hooks | 296/23 R |
| 3,765,713 | 10/1973 | Suitt | 296/3 |
| 3,770,314 | 11/1973 | Borskey | 296/137 B |
| 3,785,698 | 1/1974 | Dean | 296/137 B |
| 3,841,660 | 10/1974 | Clark | 280/179 R |
| 3,841,690 | 10/1974 | Piercy | 296/10 |
| 4,012,070 | 3/1977 | Mertz | 296/165 |
| 4,027,912 | 6/1977 | Pacca | 296/164 |
| 4,083,596 | 4/1978 | Robertson | 296/100 |

Primary Examiner—Joseph F. Peters
Assistant Examiner—John A. Carroll
Attorney, Agent, or Firm—Richards, Harris & Medlock

[57] ABSTRACT

A camper for mounting on a truck includes a mechanism to assist raising a rigid top above a truck bed. Camper beds extend outwardly from the vehicle sidewalls and a tent frame including telescoping spring biased tent rods support a canopy over the bed. The camper is collapsible having a lowered position in which the camper is lower than the truck cab for decreasing wind drag. In a raised position the camper extends about two feet above the truck cab. The camper is a self-contained unitary structure that is easily shipped and installed on or removed from a truck.

23 Claims, 31 Drawing Figures

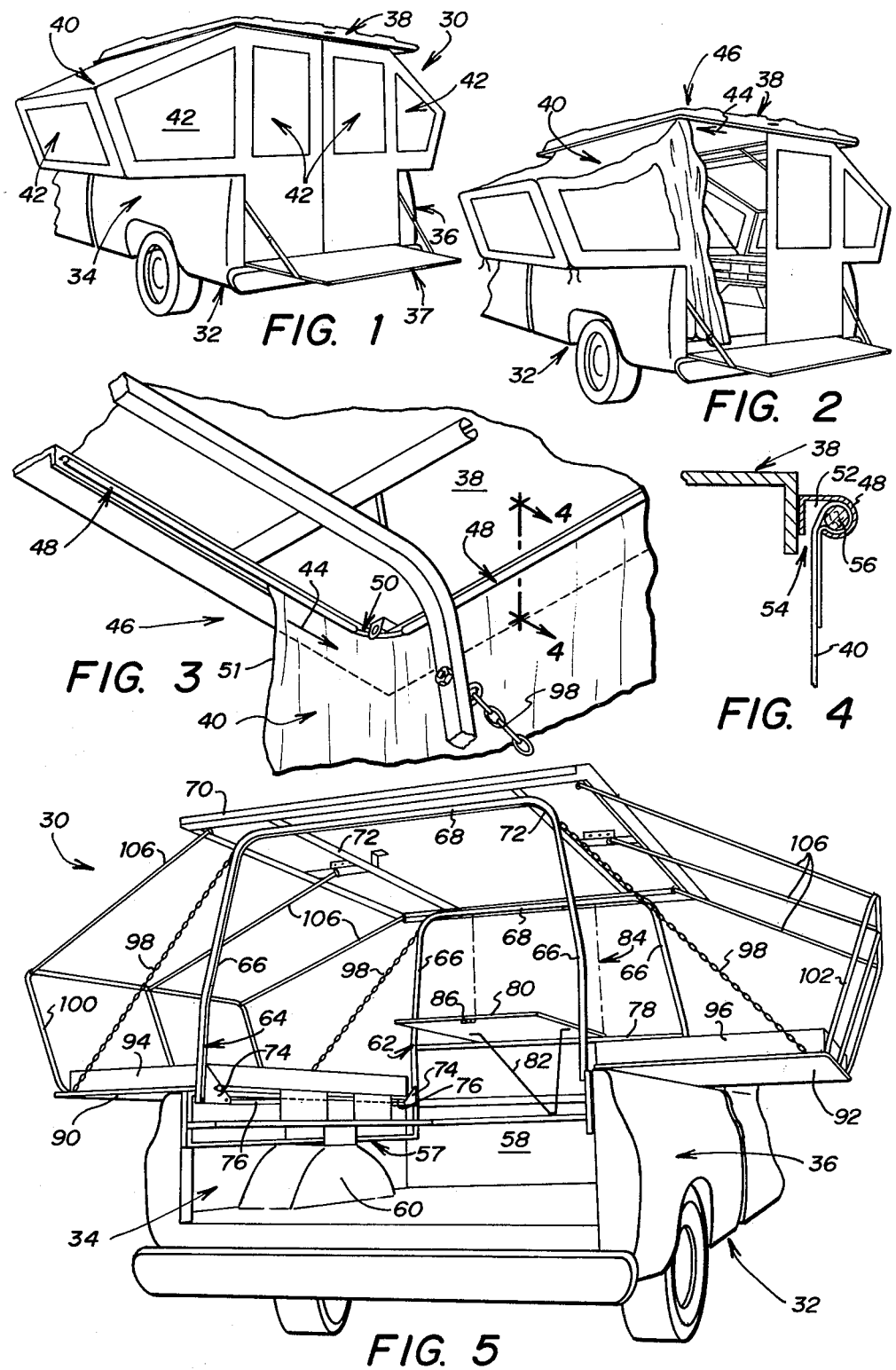

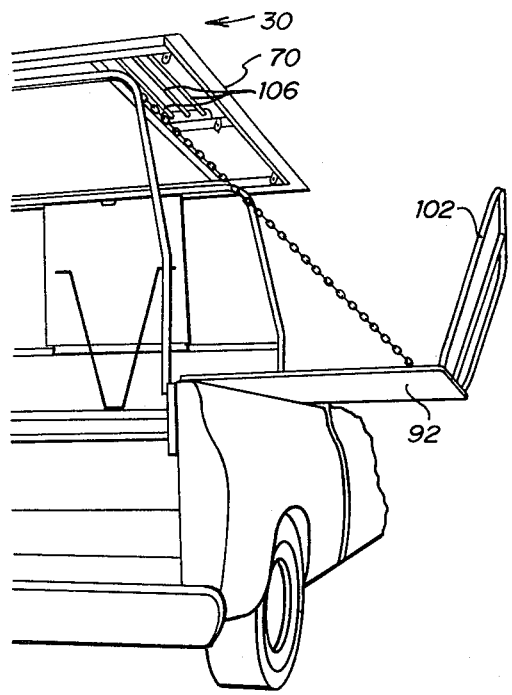
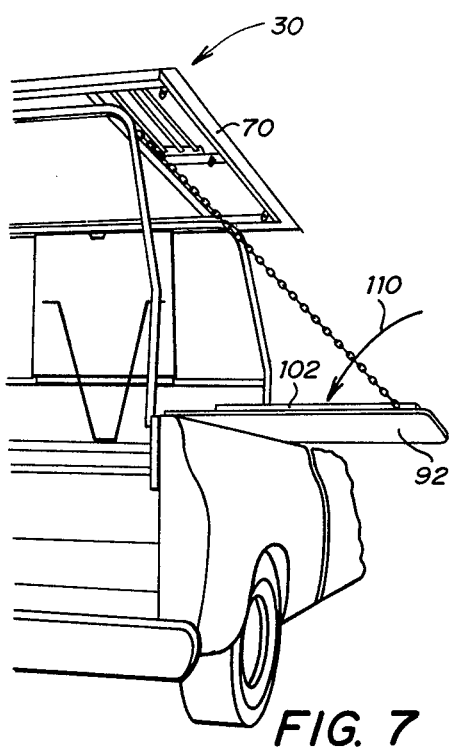
FIG. 6   FIG. 7
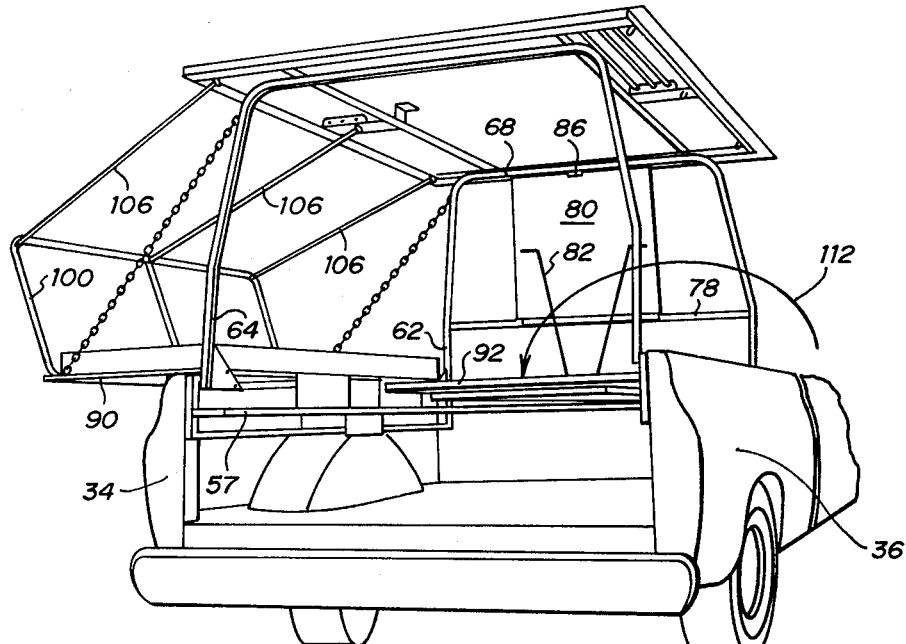
FIG. 8

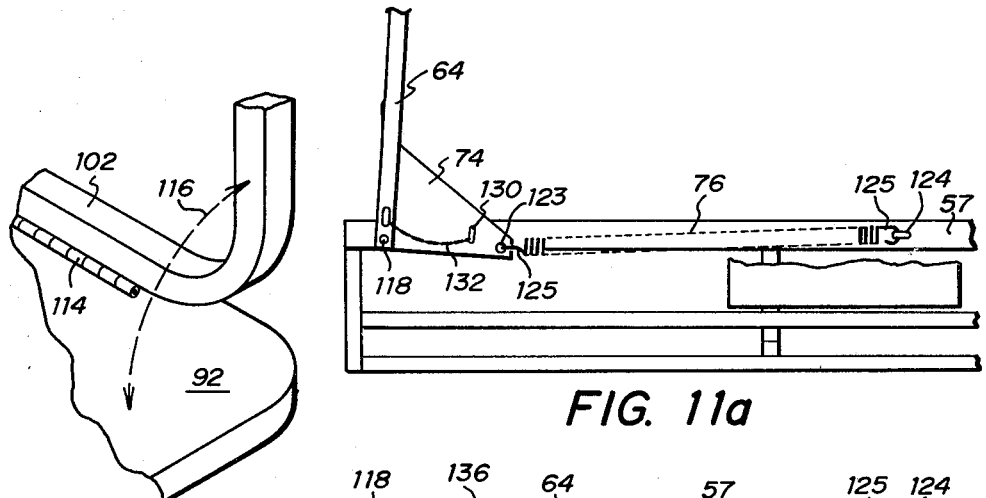
FIG. 9
FIG. 11a
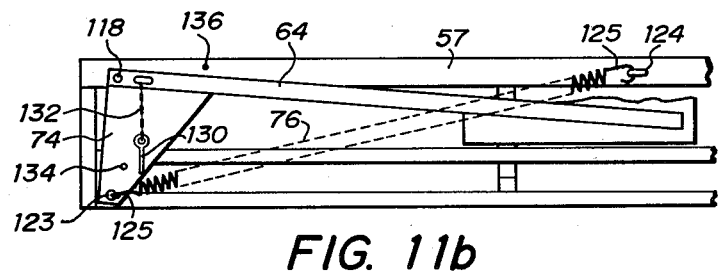
FIG. 11b
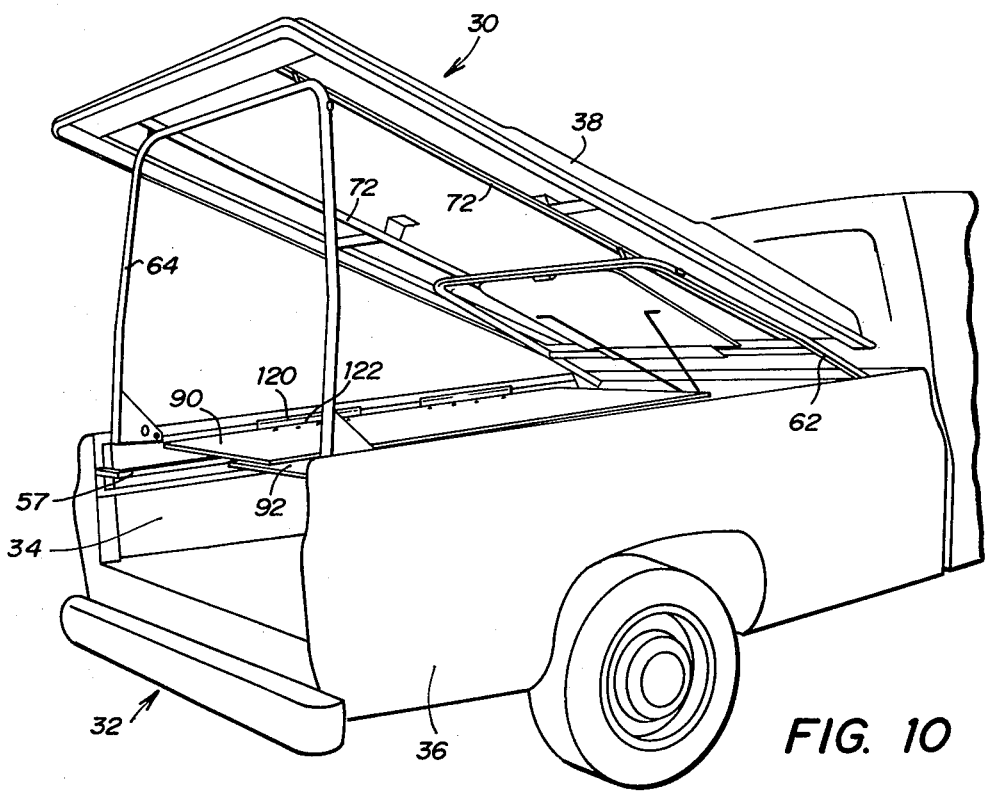
FIG. 10

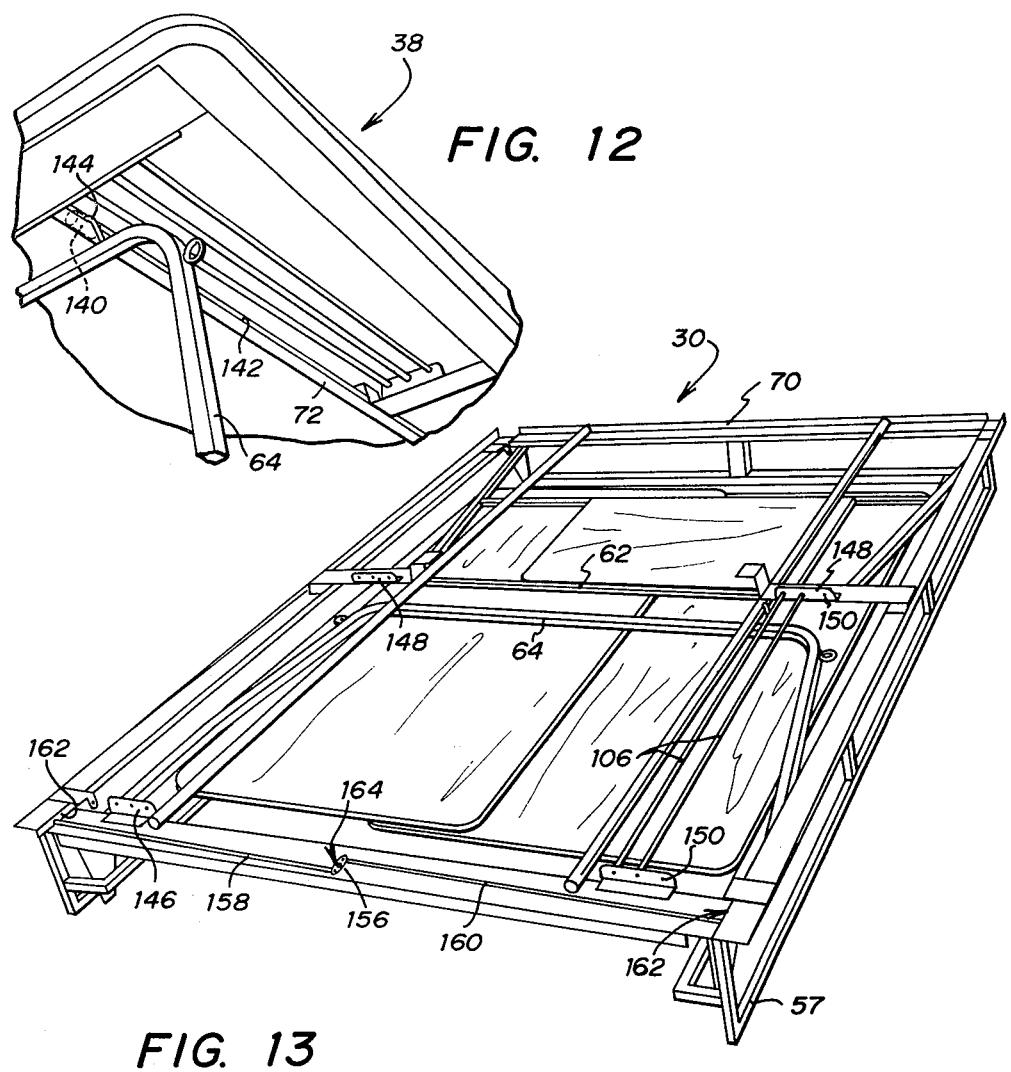
FIG. 12
FIG. 13
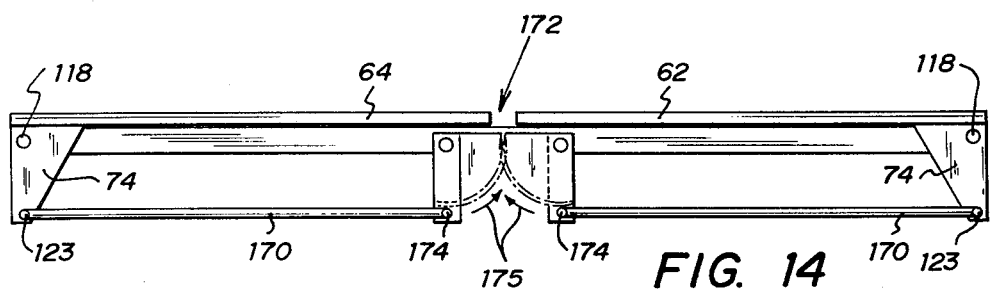
FIG. 14

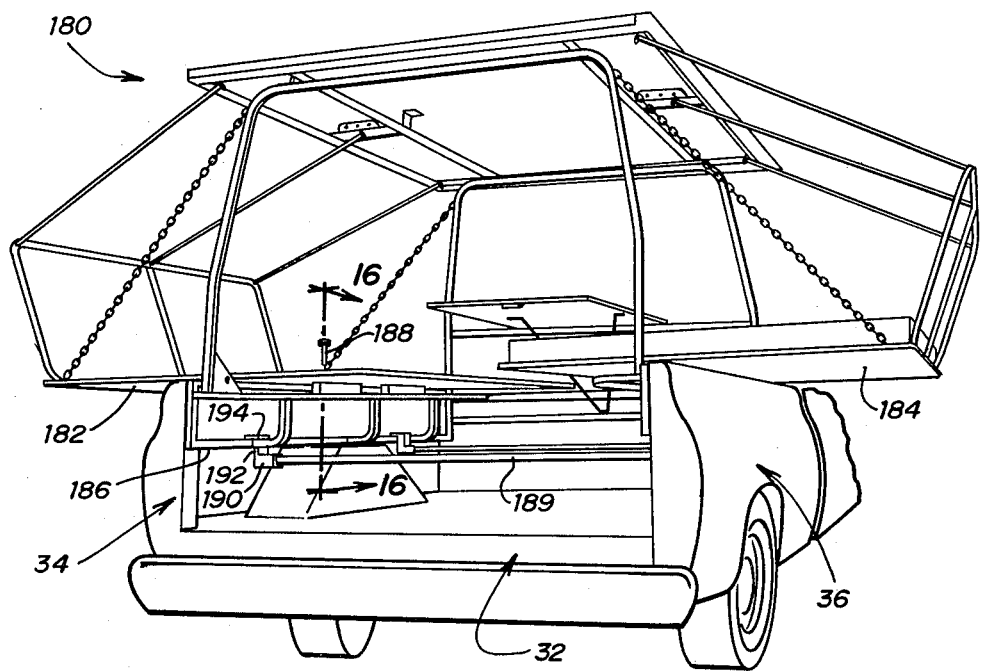
FIG. 15
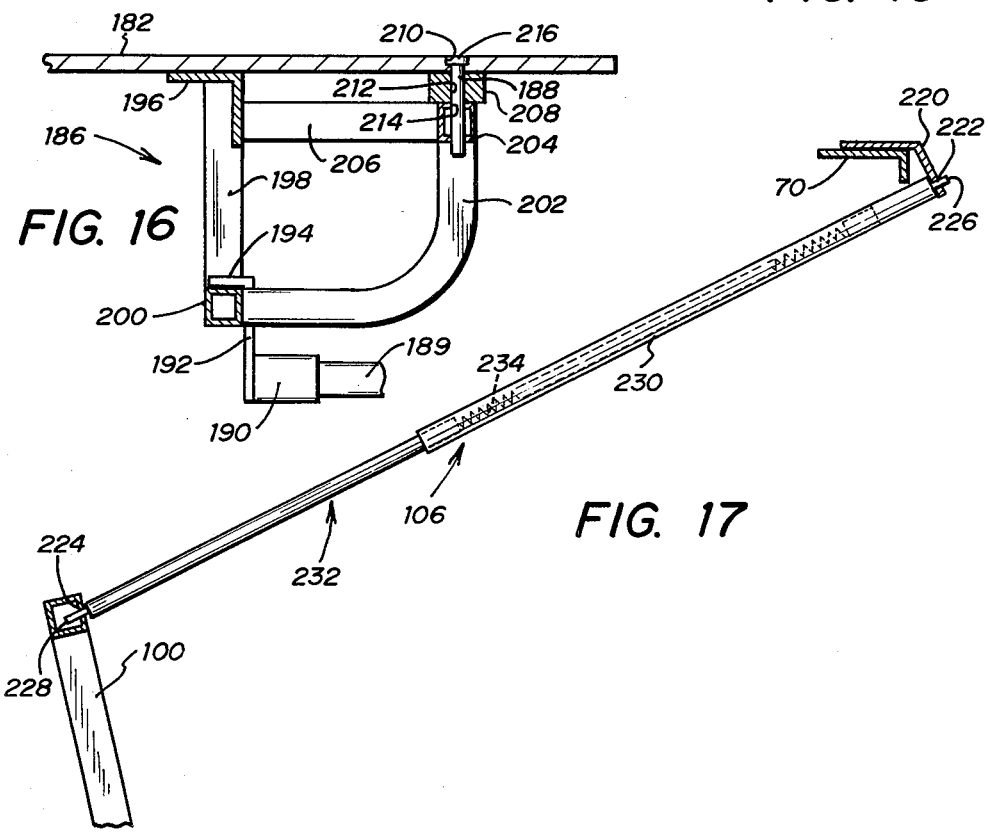
FIG. 16
FIG. 17

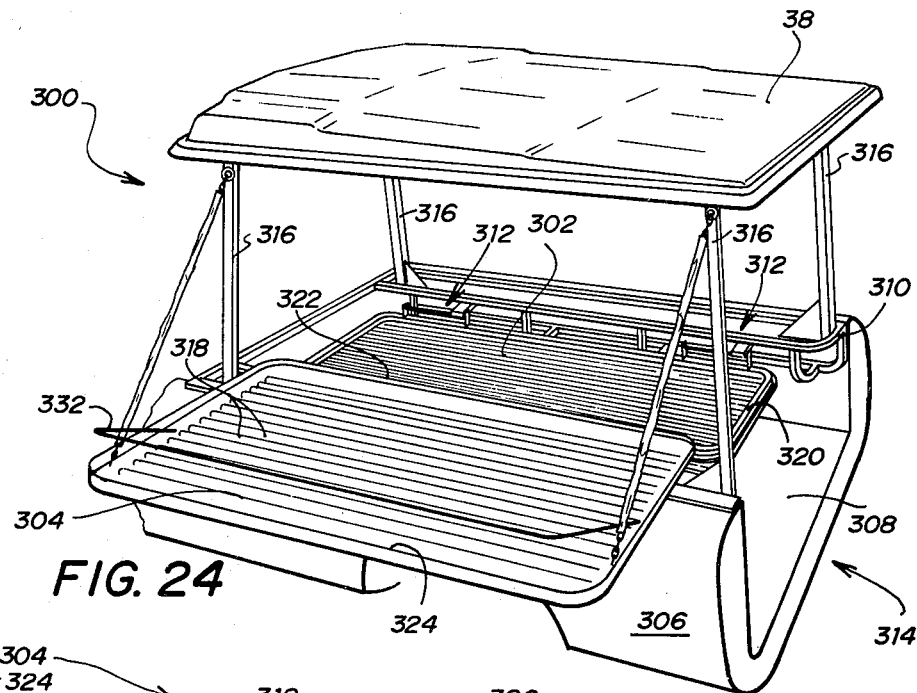
FIG. 24
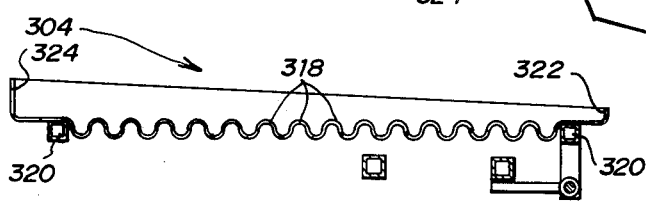
FIG. 25
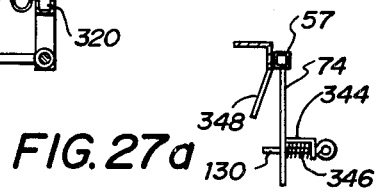
FIG. 27a
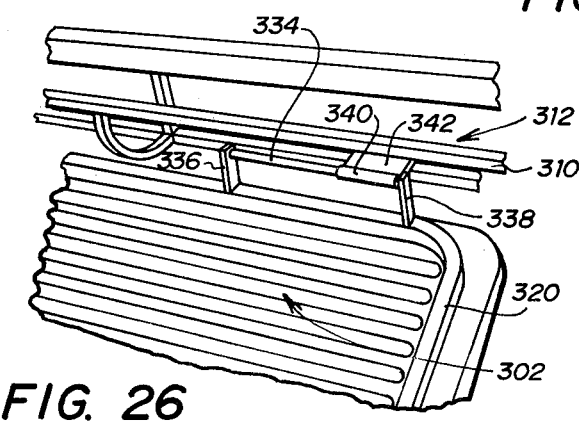
FIG. 26
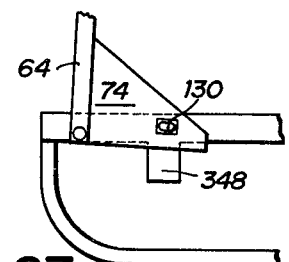
FIG. 27b
FIG. 27c

VEHICLE CAMPER

TECHNICAL FIELD

The present invention relates to shelter structure for covering vehicle beds, and particularly, relates to collapsible campers for mounting on vehicle beds.

BACKGROUND OF ART

Many types of campers are known for mounting on a vehicle and, in particular, for mounting on a pickup truck bed. Many of such campers are rigid structures that extend upwardly from the sidewalls of the truck bed and form a rigid enclosed area above the bed of the truck. This type of camper is typically heavy, bulky and aerodynamically inefficient, thereby causing significant increased fuel consumption of the vehicle.

To overcome the deficiencies of a rigid truck camper, collapsible truck campers have been developed. In general, such collapsible campers usually include a rigid top for covering the truck bed when the camper is collapsed and for being moved to a raised position to form a portion of the camper structure.

Conventional campers of the collapsible and expandable type are normally heavy, bulky and difficult to manipulate. In those campers employing rigid tops, it is often difficult to raise and lower the rigid top and its support mechanisms. Also, most campers of this type are secured directly to the truck, with the truck and camper forming an integral structural element. Such campers are not easily removed from the truck, in whole or in part.

Thus, a need has arisen for a lightweight collapsible camper that may be shipped as a single unit and may be easily mounted as a unit on a pickup truck. Also, a need has arisen for a camper in which portions of the camper, such as the beds, may be removed entirely from both the camper and the pickup truck during extended periods of nonuse of the camper. Furthermore, a need has arisen for an improved camper frame structure that is easily raised and lowered to enhance the assembly of the camper.

DISCLOSURE OF INVENTION

The foregoing and other problems associated with truck campers are solved by the present invention in which a shelter structure is mounted on a truck having a truck bed, two sidewalls, a front wall and a tailgate. The shelter structure includes a rigid top covering the truck bed that is movable between a lowered position adjacent the upper edge of the two sidewalls, the front wall and the tailgate, and a raised position elevated above the truck bed. Main frames are pivotally attached adjacent the sidewalls and slidably attached to the rigid top for supporting the rigid top in the raised position and for pivotally moving between a lowered frame position and a raised frame position. Lever structure extends from the main frames for applying a rotational force to the main frames, and tension devices, such as coil tension springs, apply a tension force to the lever structure to apply a rotational force to the main frames for urging the main frames to rotate from the lowered frame position towards the raised frame position.

In accordance with another aspect of the present invention, a pair of bed boards are attached adjacent to the upper edge of each of the sidewalls for movement between a closed position, with the bed boards disposed within the sidewalls, to an open position with the bed boards extending outwardly from the sidewalls. The bed boards are supported vertically by chains extending from the outer edges of the bed boards to the upper ends of the main frames. A canopy extends from the outer edge of the rigid top and is disposed above and along the outer edges of the bed boards in an open position to form a tent shelter enclosing a living area above the bed boards and between the rigid top and the truck bed. A tent frame supports the canopy above the bed boards and includes a pair of rectangular frames attached along the length of the outer edges of the bed boards movable between an upright position and a flat position against the bed boards. A pair of piano hinges attach the rectangular frames to the outer edges of the bed boards, and in such construction, the rectangular frames are operable through the piano hinges to rigidify and strengthen the bed boards to prevent lengthwise bowing.

A plurality of telescoping tent rods extends between the upper edge of the rectangular frame in the upright position and the outer edge of the rigid top in the raised position for supporting a canopy above the bed boards. The telescoping tent rods are spring biased to force the opposing ends of the tent rods in opposing directions. The tent rods are mounted between the rectangular frame and the rigid top by compressing the tent rods, positioning the tent rods between receiving structure on the rectangular frame and on the rigid top and releasing the tent rods for engaging the receiving structure to fixedly mount the tent rods.

The bed boards are fixedly attached adjacent the upper edges of the sidewalls by a hinge. The hinge includes a hinge plate operable to raise the bed boards above the upper edges of the sidewalls when the bed boards are in an open position and to lower the bed boards below the upper edge of the sidewalls when the bed boards are in a closed position. Alternately, the bed boards may be detachably secured in an open position adjacent the upper edges of the two sidewalls. In this latter embodiment, bed apertures are formed adjacent the inner edge of each bed board, and bed pins are dimensioned to snugly extend through the bed apertures. Receiving structure is attached to the sidewalls and includes a plurality of receiving apertures for receiving the bed pins to fasten the bed boards in an open position. To detach the bed boards, the bed pins are removed.

The canopy is attached to the rigid top by a slideway extending along the outer edges of the rigid top and having an interior channel with a longitudinal slot extending between the interior channel and the exterior of the slideway. A cord shaped portion is formed along the edge of the canopy dimensioned to fit snugly within the channel. The cord shaped portion is inserted into the channel with the canopy extending through the slot to, thereby, attach the canopy to the rigid top.

Also, a pair of opposed apertured flanges are mounted on the underside of the rigid top for mounting and storing the spring biased, telescoping tent rods between the apertured flanges. The spring force of each tent rod is operable to hold the tent rod between the apertured flanges.

In accordance with another aspect of the present invention, the shelter structure is constructed as a unitary, self contained assembly, so that the shelter structure may be easily shipped and may be easily installed on, or moved from the pickup truck as a single unit. Thus, the shelter structure includes a unitary, self contained lower frame extending along and attached to the sidewalls. The main frames and bed boards are attached to the lower frame. Thus, the lower frame supports the shelter structure and is the only part of the shelter structure that is mounted on the truck. Therefore, the shelter structure may be mounted as a single independent unit by mounting the lower frame on the sidewalls of the truck.

In an alternate embodiment of the present invention, a plurality of elongate inelastic tension members are attached for transmitting a tension force to the lever structure. A gear and crank mechanism places a tension force on the inelastic members.

In accordance with another aspect of the present invention, an improved mechanism is provided for securing the front end of the rigid top in a lowered position. The shelter structure includes a rear frame pivotally attached adjacent the rear ends of the upper edges of the truck sidewalls, and a front frame is pivotally attached adjacent the front ends of the upper edges of the truck sidewalls for rotation about a pivot. The rigid top is supported by the front and rear frames and is movable between a raised position and a lowered position. A plate is attached to and extends obliquely from the front frame, and a cable is fixedly attached at one end at a position remote from the plate and proximate to the upper edge of a sidewall. The other end of the cable is detachably secured to the front edge of the rigid top when disposed adjacent the front wall. A guide mounted on the plate slidably encloses a portion of the cable and is movable through an arc about the pivot of the front frame. The guide is operable when the front edge of the rigid top is lowered adjacent the front wall to move through an arc as the rear end of the rigid top is moved from a raised position to a lowered position to tension the cable for securing the front end of the rigid top in a closed position adjacent the front wall.

In accordance with another aspect of the present invention, an improvement is provided in a camper for mounting on a truck. The camper includes a front U-shaped frame with two legs pivotally attached adjacent the front ends of the upper edges of the sidewalls and with an upper transverse frame member extending between the upper ends of the two legs. A lower transverse frame member extends between the two legs of the U-shaped front frame, and a table is hingedly attached to the lower transverse frame member and movable between a usable position perpendicular to the U-shaped frame and a storage position coplanar with the U-shaped frame. A fastener secures the table to the upper transverse frame member to secure the table in the storage position. Table leg structure is attached to the underside of the table to vertically support the table in a usable position.

BRIEF DESCRIPTION OF DRAWINGS

The advantages and further aspects of the present invention may be best understood by reference to the following Detailed Description when considered in conjunction with the accompanying Drawings in which:

FIG. 1 is a perspective view of the erected and assembled truck camper embodying the present invention;

FIG. 2 shows the truck camper with the canopy partially removed;

FIG. 3 is a detail view of the underside of the rigid top showing the canopy being removed;

FIG. 4 is a cross sectional view taken through line 4—4 in FIG. 3 showing the slideway that is used to attach the canopy to the rigid top;

FIG. 5 is a perspective view of the truck camper in an erected position with the canopy removed and with a portion of the rigid top removed;

FIG. 6 shows a rectangular frame in an upright position attached to the outer edge of a bed board with the telescoping tent rods removed from an assembled position and placed in a storage position;

FIG. 7 shows the rectangular frame folded or rotated to a flat position against the bed board;

FIG. 8 shows one of the camper bed boards rotated or folded to the closed position;

FIG. 9 is a detail view showing the outer edge of a bed board with the rectangular frame secured thereto by a piano hinge;

FIG. 10 shows both bed boards in a closed position with the front end of the rigid top lowered from a raised position;

FIG. 11a is a detail view of a triangular plate extending from the main frame in the raised frame position with a tension spring attached to the plate;

FIG. 11b shows the main frame in the lowered frame position with the triangular plate acting as a lever to impart a rotational force to the main frame;

FIG. 12 is a detail view of the underside of the rigid top showing the sliding connection between the rigid top and the main frame;

FIG. 13 shows the collapsed truck camper removed from the truck with a portion of the rigid top removed from the camper;

FIG. 14 shows a gear and crank mechanism and an inelastic elongate member attached to the triangular plates for imparting a rotational force to the main frames;

FIG. 15 shows an alternate embodiment of the truck camper with camper beds attached to the truck sidewalls by a pin and aperture assembly;

FIG. 16 shows a cross sectional view taken through line 16—16 in FIG. 15 showing the pin and aperture assembly for attaching the camper bed boards adjacent the truck sidewalls;

FIG. 17 is a cross section of a telescoping tent rod;

FIG. 24 shows an alternate embodiment of the camper having corregated bed trays;

FIG. 25 shows a cross section of the bed trays shown in FIG. 24;

FIG. 26 shows the hinging mechanism supporting the bed tray on the frame 310; and FIGS. 27a, b and c show a locking mechanism for securing a frame in an upright position.

DETAILED DESCRIPTION

Figure 18:
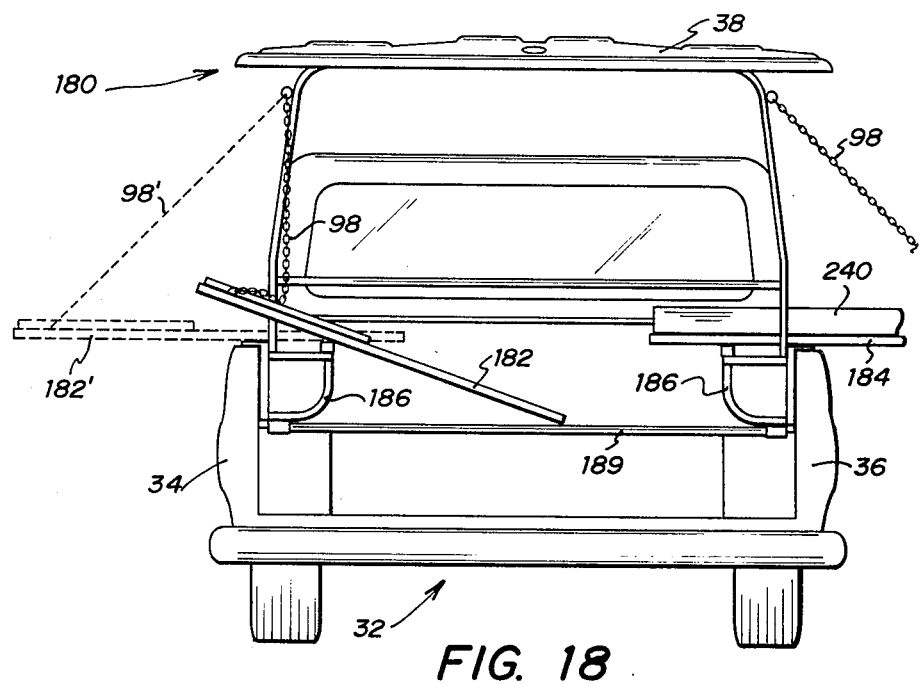
FIG. 18 shows a rear elevational view of the truck camper with one bed partially moved to the storage position.

Referring now to the Drawings in which like reference characters designate like or corresponding parts throughout the several views, there is shown in FIG. 1 a truck camper 30 embodying the present invention. The truck camper 30 is shown in an erected or assembled position and is mounted on a conventional pickup truck bed 32 having a pair of sidewalls 34 and 36 and a tailgate 37. In the erected position, the camper 30 extends outwardly from both sidewalls 34 and 36.

A rigid top 38 forms a roof or cover of camper 30 directly above the truck bed 32. A canopy 40 extends from the outer edge of the rigid top 38 forming the remaining roof area of the camper 30 and forming the upright sides of the camper. Screened windows 42 are formed in the canopy 40 to provide ventilation. The exposed portion of rigid top 38 is preferably formed from a plastic sheet material to provide a lightweight, high strength cover but may also be formed from sheet metal or fiberglass materials. The canopy 40 may be formed from any suitable tent material which repels water and is preferably lightweight.

Referring now to FIGS. 2, 3 and 4 there is shown an apparatus and method for removably attaching the canopy 40 to the rigid top 38. In FIG. 2, the canopy 40 has been threadedly moved down the outer edge of the rigid top 38 as indicated by arrow 44 to the proximity of a corner 46 of the rigid top. In FIG. 3, an underside view of the corner 46 is shown disclosing a slideway 48 that is used to attach the canopy 40 to the rigid top 38. The canopy 40 has been threaded down the slideway 48 in the direction indicated by the arrow 44 and is approaching a gap 50 in the slideway. When an edge 51 of the canopy 40 reaches the gap 50, the canopy 40 will be partially freed from the slideway 48 and may be completely removed from the slideway by threading the remaining portion of the canopy 40 in the opposite direction through and out of the gap 50.

In FIG. 4, there is shown a cross sectional view of the slideway 48 taken along the line 4—4 shown in FIG. 3. Slideway 48 includes an interior channel 52 that communicates with the exterior of the slideway through a longitudinal lengthwise slot 54. The edge of the canopy 40 includes a cord shaped portion 56 that is dimensioned to fit within the interior channel 52 but is sufficiently large to prevent the cord shaped portion 56 from passing through the longitudinal slot 54. The cord shaped portion 56 is threaded into the slideway 48 with the canopy 40 extending through the slot 54 to attach the canopy 40 to the outer edge of the rigid top 38.

Referring now to FIGS. 1 and 5, there is shown in FIG. 5 the camper 30 with a portion of the rigid top 38 and the canopy 40 removed. The tailgate 37 of the truck bed 32 has also been removed for clarity of illustration. In this view, the structural elements of the camper 30 may be readily appreciated.

A lower frame 57 is dimensioned to fit along the interior upper edge of the two sidewalls 34 and 36 and the front wall 58 of the truck bed 32. The lower frame 57 may be attached to truck bed 32 by appropriate fasteners such as clamps, bolts or the like, and the lower frame 57 is dimensioned to fit above the wheel wells 60 of the truck bed 32 and may rest on the top of the wheel wells 60 to provide additional stability and support for the lower frame. The remaining structural elements of the camper 30 are attached directly to the lower frame 57, so that the lower frame 57 forms the base support of the camper 30 in an erected position. This construction allows the camper 30 to be inserted and mounted on the truck bed 32 as a single unit, independent of the truck bed.

Front and rear main frames 62 and 64 are pivotally attached to the front and rear ends, respectively, of the lower frame 57, and are shown in a raised frame position in FIG. 5. The main frames 62 and 64 are U-shaped and each main frame includes a pair of upwardly extending legs 66 with an upper transverse frame member 68 extending between each pair of the legs 66. An upper frame 70 includes a pair of slidebars 72 that are slidably attached to the transverse frame member 68 as shall be hereinafter described in greater detail. A pair of slidebars 72 may be provided for each transverse frame member 68 so that the front and rear legs 66 may overlap in the closed position. Although the rigid top 38 is shown partially removed in FIG. 5, it will be understood that the upper frame 70 is normally attached to and supporting the rigid top and forms a part thereof.

Each leg 66 includes a lever plate 74 extending obliquely therefrom with a tension spring 76 attached between the lever plate 74 and the lower frame 57. The lever plate 74 is operable to impart a rotational force to the front and rear main frames 62 and 64 as will also be hereinafter described in greater detail.

The legs 66 may be attached to the frame 57 at inward positions relative to the sidewalk 36. Regardless of the exact position of mounting on the frame 57, the legs 66 will be defined as being mounted adjacent to the sidewall 36. The meaning of "adjacent to" will include side-by-side mounting of the legs 66 with the sidewall 34 and 36, as well as spaced apart mounting occurring when the legs are mounted inwardly on the frame 57. When the legs 66 are mounted inwardly on the frame, the canopy 40 is less likely to get caught on the legs.

The front main frame 62 includes a lower transverse frame member 78 to which a table 80 is hingedly attached. A V-shaped table leg 82 is attached to the underside of table 80 and extends to rest on the lower frame 57 to support the table 80 in a horizontal position. The table 80 may be rotated from the usable horizontal position as shown in FIG. 5 to a storage position coplanar with the front frame 62. The storage position of table 80 is generally indicated by the phantom lines 84. A fastener 86 is mounted on the outer edge of table 80 for fastening the table 80 to the upper transverse frame member 68 to secure the table 80 in a storage position.

A pair of bed boards 90 and 92 are attached to the lower frame 57 and extend outwardly from the sidewalls 34 and 36, respectively. In the embodiment shown in FIG. 5, the bed boards 90 and 92 are hingedly attached to the lower frame 57, but it will be understood that alternate methods of attachment may be used. Mattresses 94 and 96 lie on the bed boards 90 and 92 to provide a sleeping area in the camper 30. The bedboards 90 and 92 are vertically supported by bed support chains 98 that extend between the outer edges of the bedboards 90 and 92 and the upper ends of the main frames 64 and 66.

A pair of rectangular frames 100 and 102 are hingedly attached to the outer edges of the bed boards 90 and 92, respectively, and extend along the length thereof. In FIG. 5, the rectangular frames 100 and 102 are shown in an upright position with a plurality of telescoping tent rods 106 extending between the outer edge of the upper frame 70 and the upper edge of the rectangular frames 100 and 102. The telescoping tent rods 106 are spring biased to force the opposing ends of the tent rods in opposite directions. This spring force is used to mount the tent rods 106 as will be hereinafter described in greater detail. The spring force of the tent rods 106 places a tension on the canopy 40 so that the canopy resists flapping, tearing and the like even in gusting winds. The use of spring biased tent rods 106 is considered an important structural aspect of the present invention.

The main frames 62 and 64, the rectangular frames 100 and 102, the lower frame 57 and the telescoping tent rods 106 are preferably constructed of tubular metal such as tubular steel. The upper frame 70 and the plates 74 are also preferably constructed of steel, and the bed boards 90 and 92 are preferably constructed of wood. However, it will be understood that any suitable material may be used in the construction of the components of camper 30 as a matter of design choice.

Referring now to FIGS. 6, 7 and 8 there is shown the further progressive steps of disassembling the camper 30 and folding the bed boards 90 and 92 from an open to a closed position. In FIG. 6, the tent rods 106 have been moved from the assembled position as shown in FIG. 5 to a storage position with the tent rods 106 mounted on the underside of the upper frame 70. The rectangular frame 102 remains in the upright position.

In FIG. 7, the rectangular frame 102 has been rotated as generally indicated by arrow 110 from the upright position to a flat position against the bed board 92. An appropriate fastener or clamp may be used to secure the rectangular frame 102 in the flat position. In FIG. 8, the bed board 92 is rotated in the direction generally indicated by arrow 112 from the open position shown in FIG. 7 to a closed or storage position. Appropriate support devices may be employed to hold the bed board 92 in the horizontal closed position shown in FIG. 8. For example, one or more legs may be pivotally mounted on the bed board 92 for extending downwardly to engage the truck bed. Bed board 90, rectangular frame 100 and corresponding tent rods 106 are disassembled and moved to the closed or storage position in the same manner as bed board 92, rectangular frame 102 and corresponding tent rods 106.

Also shown in FIG. 8 is the table 80 in the storage position coplanar with the front main frame 62. In this position, the table 80 extends between the lower transverse frame member 78 and the upper transverse frame member 68. The table 80 is hingedly attached to the lower frame member 78 and is secured to the upper frame member 68 by a fastener 86. The V-shaped table leg 82 has rotated to a flat position against the table 80 and may be secured thereto by an appropriate fastener or clamp.

Referring now to FIGS. 9 and 6, the hinged attachment between bed board 92 and rectangular frame 102 may be appreciated. FIG. 9 is a detail view of the corner of bed board 92 and shows a piano hinge 114 that is attached between the bed board 92 and the lower edge of the rectangular frame 102. Piano hinge 114 allows a limited rotation of the rectangular frame 102 indicated by the phantom arc 116. While the bed board 92 limits the rotation of rectangular frame 102 in a downward direction, the piano hinge 114, itself, limits the rotation of rectangular frame 102 in the opposite direction. The other rectangular frame 100 is connected to the other bed board 90 by a similar piano hinge 114.

The piano hinge 114 extends along the entire length of the outer edge of bed board 92 and the lower edge of rectangular frame 102. In this manner, the rigidifying force of the rectangular frame 102 in the upright position is transmitted through the piano hinge 114 to the bed board 92 and is, thereby, operable to resist lengthwise bowing of the bed board 92. In this manner, the bed board 92 is substantially strengthened and rigidified.

Referring now to FIG. 10, the camper 30 is shown with the front end of the rigid top 38 moved towards a lowered position from the raised position as shown in FIG. 8. The bed boards 90 and 92 have previously been folded to the closed or storage position. In this view, the hinge 120 and the hinge plate 122 used to attach the bed board 90 to the lower frame 57 are visible. In the position shown in FIG. 10, hinge plate 122 extends downwardly, so that the bed board 90 is positioned within the truck bed 32 below the upper edges of sidewalls 34 and 36. However, when the bed board 90 is rotated to the open position extending outwardly from the sidewall 34, the hinge plate 122 will rotate about the hinge 120 to extend upwardly to place the bed board 90 above the upper edge of sidewall 34. In this manner, the hinge 120 and hinge plate 122 are operable to raise the bed board 90 above the upper edge of sidewall 34 in an open position and lower it below the upper edge of sidewall 34 in the closed or storage position. Bed board 92 is likewise hingedly attached adjacent the sidewall 36.

To lower the rigid top 38 to the position shown in FIG. 10, the front main frame 62 is rotated inwardly sliding along the slidebars 72. To lower the rear end of the rigid top 38, the rear main frame 64 is likewise rotated inwardly sliding along the slidebars 72. After both the front and rear main frames 62 and 64 have been rotated inwardly, the rigid top 38 will be in the lowered position directly above and adjacent the upper edges of the sidewalls 34 and 36 and will thus cover the truck bed 32.

Referring now to FIGS. 11a and 11b, a detail view of the lower end of rear main frame 64 is shown to illustrate the mechanism provided to assist movement of the frame 64 from the lowered frame position to the raised frame position. In FIG. 11a, frame 64 is shown in the raised frame position and is mounted on the lower frame 57 on a pivot 118. The spring 76 is connected to the triangular plate 74 by a catch aperture 123. The opposite end of spring 76 is attached to an eyelet 124 mounted on the lower frame 57. Hooks 125 are formed on both ends of the spring 76 for attachment to the catch aperture 123 and the eyelet 124.

Still referring to FIG. 11a, it will be appreciated that when the rear main frame 64 is in the raised position, as shown, the tension force of the spring 76 creates a force vector that is transmitted through the lever plate 74 to the main frame 64. When the rear main frame 64 is in the raised position, the force vector created by the spring 76 extends through or near the pivot 118 and, thus, would not exert a torque or a rotational force about the pivot 118.

Referring now to FIG. 11b, the rear main frame 64 is shown in the lowered frame position with the plate 74 rotated, so that the catch aperture 123 is disposed below the pivot 118. In this position, the distance between the catch aperture 123 and the eyelet 124 is increased, thus, increasing the tension force of spring 76. When the rear main frame 64 is in the lowered position, it will be noted that the force vector applied to plate 74 by the spring 76 through the catch aperture 123 does not pass through the pivot 118. The spring 76 applies a tension force to the plate 74 that transmits a rotational force or a torque to the main frame 64 urging the main frame 64 to rotate about the pivot 118. This torque or rotational force urges the rear main frame 64 to rotate from the lowered frame position to the raised frame position. In this manner, the force of the spring 76 will assist the user in raising the rear main frame 64 to the raised frame position.

Referring now to FIGS. 11a and 11b, a pin 130 is attached to the rear main frame 64 by a chain 132. A plate aperture 134 is formed in the plate 74 and a frame aperture 136 is formed in the lower frame 57. When the rear main frame 64 is moved to the raised frame position, the apertures 134 and 136 are aligned, and the pin 130 is inserted through the plate aperture 134 and the frame aperture 136 to lock the main frame 64 in the raised frame position. When the pin 130 is removed from the apertures 134 and 136, the pin hangs from the rear main frame 64 by the chain 132.

It will be understood that the front main frame 62 is constructed with corresponding structure as described above to assist movement of the front main frame 62 from the lowered frame position to the raised frame position. Also, corresponding pins 130 and apertures 134 and 136 are provided to lock the front main frame 62 in the raised frame position.

Referring now to FIG. 12, there is shown a detail view of an underside corner of the rigid top 38 showing the sliding connection between the rear main frame 64 and the slidebar 72. A sliding member 140 is shown in phantom disposed within the slidebar 72, and a longitudinal slot 142 is formed along the length of the slidebar 72. An L-shaped pin 144 is attached at one end to the sliding member 140 and extends out of the slidebar 72 through the longitudinal slot 142. The sliding member 140 could include a wheel or rollers to roll within the slidebar 72. For the purpose of this application, such connection shall be referred to as a sliding connection. The other end of the L-shaped pin 144 is attached to the main frame 64.

As the rear main frame 64 rotates between the raised frame position and the lowered frame position, sliding member 140 moves within slidebar 72, and the rigid top 38 follows the vertical movement of the main frame 64. During this motion, the L-shaped pin 144 rotates with respect to the sliding member 140 and the slidebar 72. The dimensions of the L-shaped pin 144 are chosen to allow the main frame 64 to rotate from the fully lowered frame position to the fully raised frame position.

Referring now to FIG. 13, there is shown the lower frame 57, the upper frame 70 and the main frames 62 and 64 in a collapsed position with the rigid top 38 removed for clarity of illustration. Opposing flanges 146 and 148 are mounted on the upper frame 70 and are spaced apart a sufficient distance to allow the mounting of rods 106 between the flanges. Each flange 146 and 148 includes a plurality of apertures, such as apertures 150, for receiving the ends of telescoping rods 106 to mount the rods between the flanges 146 and 148. In position between the flanges 146 and 148, the telescoping tent rods 106 are in the stored position.

By referring to FIG. 13, it may be readily appreciated that the camper 30 is structurally an independent, self contained unit. The lower frame 57, alone, may be attached to a truck bed 32 with the remaining parts of the camper 30 attached to the lower frame 57. Also, the self contained construction of the camper 30 provides an efficient lightweight shelter structure that is easily packaged and shipped.

Still referring to FIG. 13, there is shown a latch mechanism 156 for securing the rear end of the upper frame 70 to the lower frame 57. The latch mechanism 156 includes a pair of sliding rods 158 and 160 disposed to slide towards and away from receiving structure 162 on the lower frame 57. The interior ends of rods 158 and 160 are attached to opposite ends of a pivot arm 164. By rotating the pivot arm 164 in alternate directions, the rods 158 and 160 may be moved towards and away from the receiving structure 162 to alternately latch and unlatch the upper frame 70 to the lower frame 57. This construction is described in U.S. Pat. No. 4,079,989 to Robertson.

Referring now to FIG. 14, there is shown an alternate mechanism for applying a rotational force to the main frames 62 and 64. A pair of inelastic elongate members 170 are attached to the plates 74 at the catch aperture 123. The other ends of the members 170 are attached to a gear and crank mechanism 172 at pivots 174. When the gear and crank mechanism 172 is rotated in the direction indicated by arrows 175, a tension force is applied through the members 170 to impart a force to the plates 74 which transmits a rotational force or torque to the main frames 62 and 64 causing them to rotate about pivots 118. Thus, the gear and crank mechanism 172 in association with the inelastic elongate members 170 performs the same function as the tension springs 76 in assisting the movement of the main frames 62 and 64 from the lowered frame position to the raised frame position. Numerous other mechanical devices may be used to apply a force to plates 74, such as hydraulic cylinder assemblies or a cable and winch.

Referring now to FIG. 15, there is shown a camper 180 incorporating an alternate embodiment of the present invention. Camper 180 is substantially similar to camper 30 except for the construction of the bed boards 182 and 184 and the lower frame 186. The bed boards 182 and 184 extend outwardly from the two sidewalls 34 and 36 and also extend inwardly therefrom to form seat-like structures within the truck bed 32. The bed boards 182 and 184 are not fixedly attached to the lower frame 186 but are removably attached by a plurality of pins, such as pin 188 shown aligned for insertion through the bed board 182 and into the lower frame 186.

A plurality of cross bars 189 are supported by the lower frame 186 and extend between the sidewalls 34 and 36. A socket 190 is mounted on either end of the cross bars 189, and an L-shaped flange 192 extends upwardly and outwardly therefrom. The top portion 194 of the L-shaped flange 192 rests on the lower frame 186 to support the cross bar 189.

Referring now to FIG. 16, a cross sectional view is shown taken along line 16—16 in FIG. 15. The lower frame 186 includes a flange 196 for being attached along the two sidewalls 34 and 36. A plurality of downwardly extending bars 198 are attached to a bar 200 that is disposed parallel to the flange 196 to form a generally rectangular frame. A curved bar 202 extends to vertically support an inwardly disposed bar 204. A cross bar 206 also extends from flange 196 to the bar 204 to provide additional stability and support. A spacer bar 208 is mounted above the bar 204.

To mount the bed board 182 to the lower frame 186, apertures 210, 212 and 214 are formed in the bed board 182, the spacer bar 208 and the bar 204, respectively, to receive the pin 188. A head 216 is formed on the pin 188, and the aperture 210 is dimensioned to include a recess for receiving the head 216, so that a flat even surface is maintained on the upper surface of the bed board 182. In this construction, the pins may be easily inserted and removed from the apertures 210, 212 and 214 to selectively attach and detach the bed board 182 to the lower frame 186.

Referring now to FIGS. 17 and 8, the construction and operation of the telescoping tend rods 106 may be appreciated. In FIG. 17, a tent rod 106 is shown mounted between rectangular frame 100 and the upper frame 70 as it would appear in the assembled position. A flange 220 extends from the upper frame 70 and includes an aperture 222 for receiving the end of the tent rod 106. Likewise, the rectangular frame 100 includes an aperture 224 for receiving the opposite end of tent rod 106. Pins 226 and 228 extend coaxially from the ends of tent rod 106 and are dimensioned for insertion into the apertures 222 and 224, respectively. The tent rod 106 includes two coaxial shafts 230 and 232 that operate in a telescoping relationship. The shaft 232 is dimensioned to slide snuggly but freely within the shaft 230. A compression spring 234 is mounted within the shaft 230 to operate against the shaft 232 to urge the shaft 232 outwardly. Thus, the opposing ends of the tent rod 106 are urged in opposing directions when the compression spring 234 is compressed within the shaft 230.

To mount the tent rod 106 between the rectangular frame 100 and the upper frame 70, the tent rod 106 is compresed forcing shaft 232 into shaft 230. After the pins 226 and 228 are inserted into the apertures 222 and 224, the tent rod 106 is released allowing the spring 234 to hold the tent rod in position between rectangular frame 100 and upper frame 70. To remove the tent rod 106, the tent rod 106 is again compressed, and the pins 226 and 228 are removed from the apertures 222 and 224.

Referring now to FIG. 18, there is shown an end elevational view of the truck bed 32 and the camper 180. In FIG. 18, bed board 182 is partially moved to the stored position while the bed board 184 remains in the erected or assembled position. The bed board 182 was moved from the assembled position generally indicated by dotted lines 182' and 98' by sliding the bed board 182 inwardly on the lower frame 186 until the bed board 182 tilted to engage the cross bars 189. The bed board 182 is then urged further towards the sidewall 36 until the bed board 182 rests completely on the cross bars 189.

Figure 19:
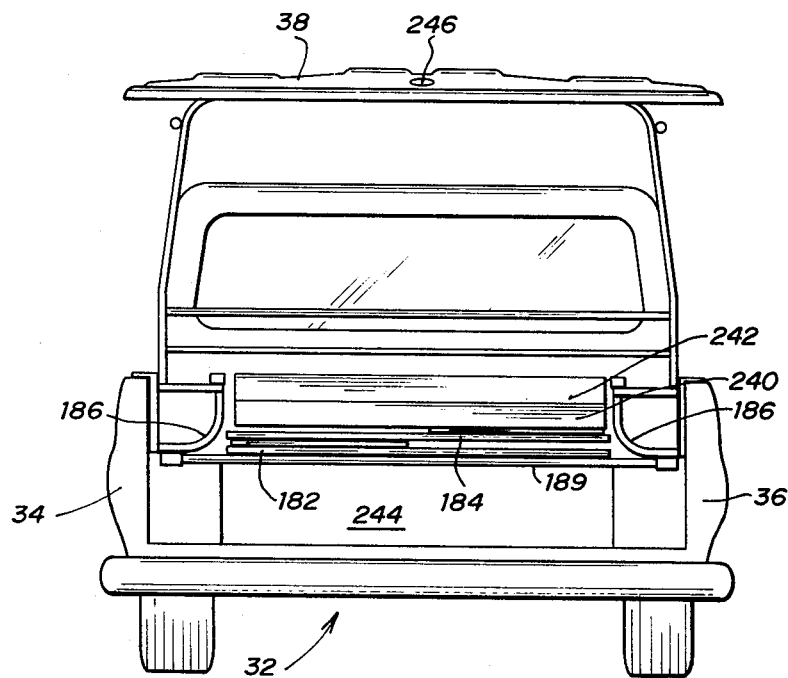
FIG. 19 is a rear elevational view showing both beds moved to a stored position supported by bars extending between the truck sidewalls.

After the mattress 240 has been removed from the bed board 184, the bed board 184 is likewise moved in a sliding motion until it rests on the bed board 182 supported by the cross bars 189. Then the two mattresses 240 and 242 that were formerly resting on the bed boards 182 and 184 are stored above the bed boards in a stored position as shown in FIG. 19. The area 244 below the cross bars 189 and the bed boards 182 and 184 in the stored position forms a useful cargo space and may be used to contain the canopy 40 after it is removed from the camper 180.

Referring now to FIGS. 19, 13 and 11, there is shown a handle 246 in FIG. 19 used to turn the pivot arm 164 shown in FIG. 13. In this construction, the rear end of the rigid top 38 may be secured to the lower frame 186 to lock the rigid top 38 in a lowered position and to prevent the tailgate 37 of the truck bed 32 from inadvertently opening. This construction is substantially similar to the corresponding structure described in U.S. Pat. No. 4,079,989 to Robertson.

Figure 20:
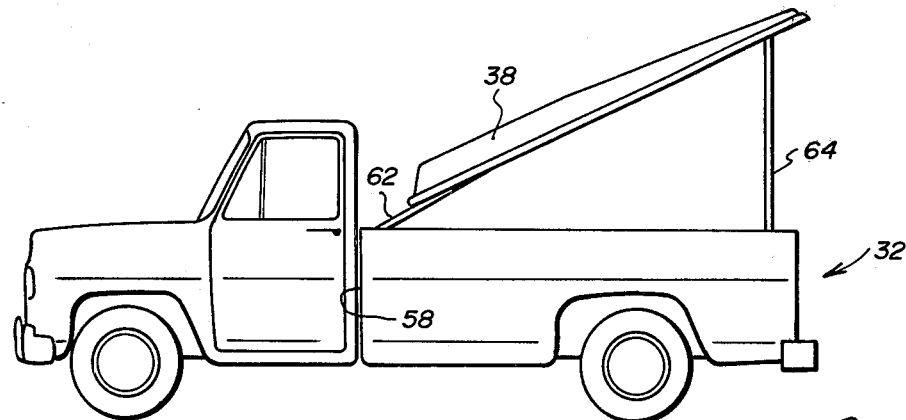
FIG. 20 is a side elevational view of the truck camper showing the rigid top moved vertically towards the lowered position.
Figure 21:
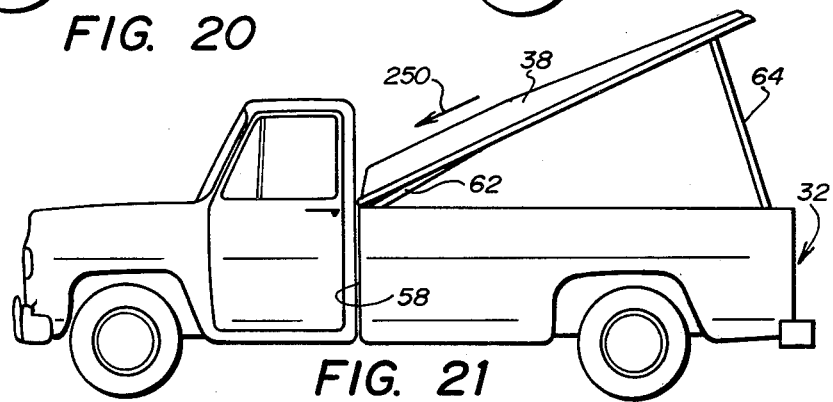
FIG. 21 shows the rigid top moved adjacent to the front wall of the truck.

Referring now to FIGS. 20-23, there is shown an improved method of construction for securing the front end of the rigid top 38 to the truck bed 32. The front end of the truck bed 32 is first lowered to the position shown in FIG. 20 in which the rear main frame 64 remains in the fully raised frame position. Then, as shown in FIG. 21, the rigid top 38 is forced in the direction indicated by the arrow 250 to force the front end of the rigid top 38 adjacent the front wall 58 of the truck bed 32.

Figure 22A:
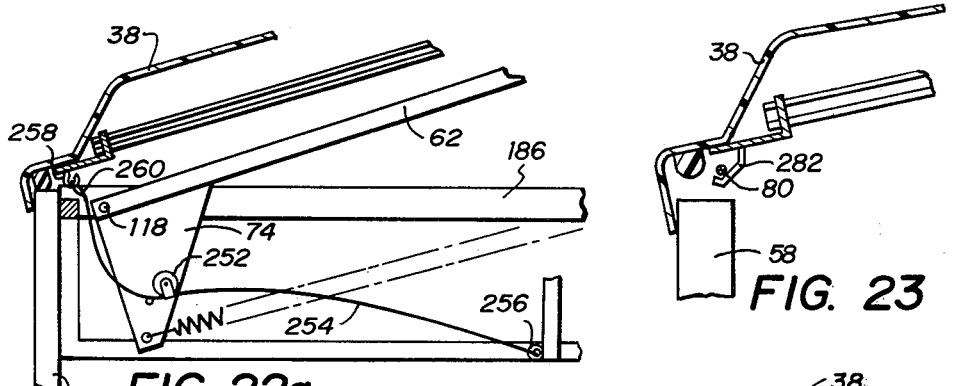
FIG. 22a is a cross sectional view of the lower end of a main frame and the front end of the rigid top showing a guide pulley on a triangular plate.

With the rigid top 38 in position as shown in FIG. 21, the front main frame 62 is in the position shown in FIG. 22. As shown in FIG. 22a, a guide pulley 252 is attached to the plate 74 at a position remote from the front main frame 62, and a cable 254 is threaded through the guide pulley 252. One end of the cable 254 is fixedly secured to the lower frame 186 at an eyelet 256, and the other end of cable 254 is removably attached to the rigid top 38 by a hook 258 extending from top 38 and an eyelet 260 formed on the end of cable 254. In the position shown in FIG. 22a, the cable 254 has sufficient length to extend between eyelet 256 and hook 258 and through guide pulley 252 with at least a slight amount of slack, such that eyelet 260 may be easily hooked over hook 258.

Referring now to FIG. 22a, the rigid top 38 is shown in the lowered position. In moving from the position shown in FIG. 22a to the position shown in FIG. 22b, guide pulley 252 has moved in an arc about the pivot 118, so that the total distance from hook 258, through guide pulley 252 to eyelet 256 has increased. Thus, the cable 254 is tensioned pulling the rigid top 38 firmly against the front wall 58. With the tension in cable 254, there is no slack in the cable 254 to allow the eyelet 260 to be removed from the hook 258. The tension exerted by cable 254 is sufficient to compress a sealing gasket 272 between the front wall 58 and the rigid top 38 to form a seal therebetween. In this manner, an inexpensive and effective mechanism is provided for securing the front end of the rigid top 38 in the lowered position.

Figure 23:
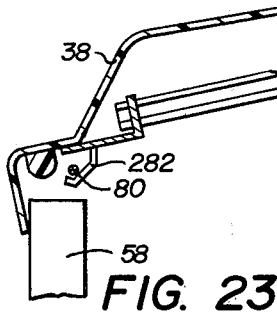
FIG. 23 shows an alternate apparatus for securing the front end of the rigid top in a closed position.
Figure 22B:
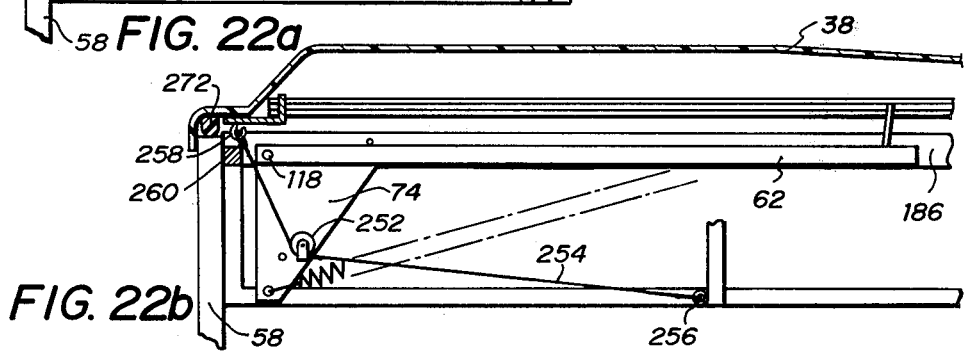
FIG. 22b shows a cross sectional view of the rigid top in a lowered position with the guide pulley and a cable securing the front end of the rigid top in a closed position.

In FIG. 23, an alternate method of securing the front end of the rigid top 38 in a closed position is shown. A cylindrical bar 280 is secured in a spaced apart relationship along the top edge of the front wall 58, and one or more prongs 282 are secured to the rigid top 38. When the front edge of the rigid top 38 is moved to a closed position, the prong 282 is inserted beneath the bar 280. As the rear end of the top 38 is rotated to a closed position, the prong 282 rotates, exerting an upward pressure on the bar 280 and firmly securing the top 38 in the closed position.

Thus, the prongs 282 and the bar 280 form a fastener that is engaged when the front end of the rigid top 38 is in a lowered position and the rear end thereof is in a raised position. The fastener, thus formed, locks and applies a downward force on the rigid top 38 when the rear end of the rigid top is moved from a raised position to a lowered position.

As best shown in FIGS. 2, 10 and 20, the rigid top 38 moves from an elevation of less than one foot above the side walls 36 in the closed position to an elevation of about two feet above the cap of the truck in the open position. In the closed position, the top 38 is well below the top of the truck cab and improves the aerodynamics of the truck by covering the open truck bed. Thus, the camper of the present invention provides the advantages of a low profile when driving and provides the advantages of a high profile camper when camping.

Referring now to FIG. 24, there is shown yet another embodiment of the present invention. In FIG. 24, a perspective view of a camper 300 is shown with a bed tray 302 pivoted to a horizontal closed position and with a bed tray 304 shown in an open position extending outwardly from a pickup truck sidewall 306. In the closed position, the bed tray 304 is disposed directly above a pickup truck bed 308.

Both bed trays 302 and 304 are pivotally connected to the camper frame 310 by sliding hinges 312. The sliding hinges 312 allow the bed trays 302 and 304 to be pivoted from the open position to the closed position and then pushed forward away from the rear 314 of the pickup truck bed 308.

The provision of the sliding hinges 312 is considered an important aspect of the present invention. To pivot the bed trays 302 and 304 between the open and closed position, the bed trays must be positioned to pass through upright members 316 that support the rigid top 38. Thus, the bed trays 302 and 304 must be smaller in length than the truck bed 308 and must be centered with respect to the truck bed 308. However, after the bed trays 302 and 304 have been moved to the closed position, there is room in the truck bed 308 to move the trays 302 and 304 forward. After the trays 302 and 304 have been moved forward on the sliding hinges 312, the usable space at the rear 314 of the truck bed 308 is increased. In the preferred embodiment, the distance from the rear of the trays 302 and 304 in the closed position to the rear of 314 of the truck bed 308 is approximately 22 inches. This distance is sufficient to allow an icebox to be placed and stored in the rear 314 of the truck bed 308 even when the camper 300 is folded to the closed position. An icebox is an indispensable item to the vast majority of campers. Thus, the ability to store an icebox in the pickup truck bed 308 is of great importance to the usefulness of the camper 300.

The bed trays 302 and 304 are constructed from plastic in a geometry to provide strength. Ridges or corregations 318 extend along the length of the bed trays 302 and 304, and a steel frame 320 extends around the perimeter of the corregation. In FIG. 25, a cross section of bed tray 304 is shown. In this view, the corregations 318 are clearly shown with the steel frame 320 extending about the perimeter of the corregations 318. The lengthwise corregations 318 in combination with the steel frame 320 have been found to form a strong and relatively inexpensive bed tray. However, it is envisioned that other strengthening geometries may be used in the construction of the bed trays 318.

Also, in FIGS. 24 and 25, it is shown that the rim extending around the bed trays 302 and 304 is tapered such that the interior rim 322 is short compared to the exterior rim 324. The larger exterior rim 324 ensures that a mattress placed in the bed tray 304 will not slip outwardly. The shorter interior rim 322 prevents a mattress from sliding inwardly in the bed tray 304, but at the same time is sufficiently small to allow a person to sit on the edge of a mattress in the bed tray 304 without engaging the interior rim 322.

Referring again to FIG. 24, there is shown a tent frame 332 pivotally attached to the bed tray 304. The function of the tent frame 332 is to support a tent or canopy above the bed tray 304 which extends from the rigid top 38. The tent frame 332 is dimensioned and is pivotally attached to the tray 304 at a selected position such that the forces from the tent or canopy will hold the tent frame 332 at a desired position. In this construction, if desired, it is not necessary to use tent rods, such as rods 106 shown in FIG. 5, to hold the tent frame 332 in the desired position.

The sliding hinge 312 is shown in greater detail in FIG. 26 and includes a shaft 334 mounted between flanges 336 and 338. The flanges 336 and 338 are welded to the frame 320 and extend in a direction generally perpendicular to the bed tray 304.

The shaft 334 is disposed for rotation within a cylinder or bushing 340 formed on the end of a plate 342. The end of the plate 342 opposite from the bushing 340 is welded to the frame 310. In this construction, the bed tray 302 may move forwardly and rearwardly with the shaft 334 sliding within the bushing 340. In FIG. 26, the bed tray 302 is shown positioned in its most forward position with the bushing 340 abutting the mounting flange 338. In the most rearward position of the bed tray 302, the bushing 340 would abut the mounting flange 336.

It should be noted that the bed trays 302 are mounted on the inward portion of frame 310 so that approximately one quarter of the trays 302 are disposed over the truck bed 308 and the side walls 306. The inward mounting of the bed trays 302 relative to the side walls 306 results in a stable and strong construction.

An improved method for locking the main frame 64 in an upright position is shown in FIGS. 27a–c. In conjunction with FIGS. 11a and b, there was described one apparatus for locking the main frame 64 in an upright position in which a pin 130 was inserted through a triangular plate 74 and into an aperture 136. To provide an apparatus for automatically locking the main frame 64 in an upright position, the pin 130 is mounted for sliding motion in an L-shaped pin mount 334 as shown in FIG. 27a. The pin 130 extends through one end of the mount 334 and through the triangular plate 74 for sliding motion therethrough. A spring is disposed about the pin 130 and within the spring mount 334. The spring 346 is attached to the pin 130 at one end and operates against the spring mount 334. In this construction, the pin 130 is spring biased towards a skid plate 348.

The skid plate 348 extends from the frame 57 at an inclination angle with respect to the triangular plate 74. The pin 130 and the skid plate 348 and dimensioned such that the pin 130 engages the skid plate 348 on the inclined surface as the triangular plate 74 is rotated upwardly. In FIG. 27b, the drawing is partially broken away to reveal the skid plate 348 and the aperture 136. It will be appreciated that as the triangular plate 74 rotates upwardly, the pin 130 is moving in an arc that will intersect the aperture 136. As the pin 130 slides up the skid plate 348, the pin 130 is forced outwardly away from the skid plate 348. When the plate 74 is rotated to the position shown in FIG. 27c, the pin 130 and the aperture 136 are aligned and the spring force of spring 346 forces the pin 130 into the aperture 136. In this manner, the main frame 64 is automatically locked in an upright position.

To unlock the main frame 64 from the upright position for rotation back to the storage position, the pin is pulled out of the aperture 136, and the triangular plate 74 is rotated slightly so that the pin 130 and the aperture 136 are no longer aligned. After the pins 130 on both ends of the frame 64 are pulled from the aperture 136 and moved out of alignment, the main frame 64 is in condition for rotation to the lowered position. Using the above described automatic locking apparatus, one person may easily raise and lower the main frame 64.

In the foregoing Detailed Description, preferred embodiments of the present invention have been described in detail. However, it will be understood that although specific embodiments have been described, the present invention is capable of numerous rearrangements, modifications and substitutions of parts without departing from the spirit of the invention.

I claim:

1. A camper mounted on a truck having a truck bed, two sidewalls, a front wall and a truck cab, said camper comprising:

a camper top disposed above the two sidewalls and the front wall of the truck, said camper top being movable between a lowered position in which said top is adjacent the upper edge of the two sidewalls and the front wall and is below the top of the truck cab and a raised position in which said top is elevated above the vehicle bed to a height above the truck cab, said camper top being operable to improve the aerodynamics of the truck when in the lowered position to reduce wind drag on the truck when moving;

a main frame for supporting said camper in the raised position and being collapsible for storage beneath said camper top in the lowered position;

a pair of camper beds movable between a closed position and an open position, said camper beds being disposed above the truck bed and below the camper top in the closed position, said beds extending outwardly from the two sidewalls of the truck in the open position;

a canopy forming a tent shelter over said camper beds in an open position to provide a covered sleeping area above said camper beds; and a tent frame for supporting the canopy above said camper bed comprising:

a pair of generally rectangular frames extending from said camper beds for supporting said canopy;

at least one telescoping tent rod extending between each rectangular frame and the outer edge of said rigid top in the raised position for supporting said canopy above said camper bed;

receiving structure formed on the outer edges of said rigid top and the upper edges of said rectangular frames for receiving opposing ends of said telescoping tent rods; and spring means disposed within said telescoping tent rods to urge the opposing ends of said telescoping tent rods in opposite directions against said receiving structure to secure said telescoping tent rods between said rigid top and said rectangular frames, said telescoping tent rods and springs being operable to exert a tension force on said canopy so that said canopy is resistant to flapping and tearing in wind.

2. The camper of claim 1 further comprising at least one pair of opposed receiving structures mounted on the underside of said rigid top for mounting and storing said telescoping tent rods between said receiving structures when the camper is not in use.

3. The camper of claim 1 further comprising:

sliding hinge means for mounting said camper beds ajacent the upper edges of said sidewalls for pivotal and sliding movement, said camper beds being pivotal from an open position extending outwardly from the sidewalls to a closed position above said truck beds;

said camper beds in the open position being disposed for passing through said main frame when pivoted from the open to the closed position; and said sliding hinge means allowing said camper beds to slide in a closed position in a direction parallel to the sidewalls.

4. The camper of claim 1 wherein each of said camper beds includes a bed tray, said bed tray comprising:

a bed support surface having a strengthening geometry along its length, said strengthening geometry providing sufficient strength to resist lengthwise bowing and to support people while sleeping;

a metal frame extending beneath said bed support surface generally about the perimeter of said bed support surface and defining the perimeter of said strengthening geometry, said metal frame providing rigidity and reinforcement for said bed support surface; and a sliding hinge for pivotally attaching said metal frame adjacent the upper edge of the sidewalls to mount the bed tray on the truck for rotation between an open generally horizontal position extending outwardly from the sidewall to a closed generally horizontal position disposed above said truck bed in a spaced apart relationship, said hinge further allowing the bed tray to slide in a lengthwise direction in the closed position.

5. A camper mounted on a truck having a truck bed, two sidewalls, a front wall and a truck cab, said camper comprising:

a camper top disposed above the two sidewalls and the front wall of the truck, said camper top being movable between a lowered position in which said top is adjacent the upper edge of the two sidewalls and the front wall and is below the top of the truck cab and a raised position in which said top is elevated above the vehicle bed to a height above the truck cab, said camper top being operable to improve the aerodynamics of the truck when in the lowered position to reduce wind drag on the truck when moving;

a main frame for supporting said camper in the raised position and being collapsible for storage beneath said camper top in the lowered position comprising:

a front U-shaped frame having two legs pivotally attached adjacent the front end of the upper edges of the sidewalls and having an upper transverse frame member extending between the upper end of the two legs for supporting the front end of the rigid top;

a lower transverse frame member extending between the two legs of the U-shaped front frame;

a table hingedly attached to said lower transverse frame member immovable between a usable position perpendicular to said U-shaped frame and a storage position coplanar with said U-shaped frame;

fastener means for securing one end of the table to the upper transverse frame member to hold said table in the storage position; and support leg means for vertically supporting the table in the usable position;

a pair of camper beds movable between a closed position and an open position, said camper beds being disposed above the truck bed and below the camper top in the closed position, said beds extending outwardly from the two sidewalls of the truck in the open position;

a canopy forming a tent shelter over said camper beds in an open position to provide a covered sleeping area above said camper beds; and a tent frame for supporting the canopy above said camper beds.

6. A camper mounted on a truck having a truck bed, two sidewalls, a front wall and a truck cab, said camper comprising:

a camper top disposed above the two sidewalls and the front wall of the truck, said camper top being movable between a lowered position in which said top is adjacent the upper edge of the two sidewalls and the front wall and is below the top of the truck cab and a raised position in which said top is elevated above the vehicle bed to a height above the truck cab, said camper top being operable to improve the aerodynamics of the truck when in the lowered position to reduce wind drag on the truck when moving;

a main frame for supporting said camper in the raised position and being collapsible for storage beneath said camper top in the lowered position;

a pair of camper beds movable between a closed position and an open position, said camper beds being disposed above the truck bed and below the camper top in the closed position, said beds extending outwardly from the two sidewalls of the truck in the open position;

a canopy forming a tent shelter over said camper beds in an open position to provide a covered sleeping area above said camper beds;

a tent frame for supporting the canopy above said camper beds;

sliding hinge means for mounting said camper beds adjacent the upper edges of said sidewalls for pivotal and sliding movement, said camper beds being pivotal from an open position extending outwardly from the sidewalls to a closed position above said truck beds;

said camper beds in the open position being disposed for passing through said main frame when pivoted from the open to the closed position; and said sliding hinge means allowing said camper beds to slide in a closed position in a direction parallel to the sidewalls and comprising:

at least two support flanges extending downwardly from the bottom of said camper beds in an open position;

a shaft fixedly mounted between the ends of said support flanges and spaced apart from said camper beds;

a bearing means rotatably and slidably mounted on said shaft for rotating motion about said shaft and for sliding motion along said shaft between said support frames; and a support plate extending from said bearing means for being fixedly attached adjacent the upper edge of sidewalls to mount said bearing means adjacent said sidewalls.

7. The camper of claim 6 further comprising:

a lower frame mounted adjacent the top edge of said sidewalls and extending inwardly therefrom;

said support plate being attached to said lower frame at a position inwardly spaced from the sidewall so that said camper beds rotate about an axis inwardly spaced from the sidewalls; and said camper beds being disposed in an open position with about one quarter of the camper beds located above the truck bed and sidewalls.

8. A camper mounted on a truck having a truck bed, two sidewalls, a front wall and a truck cab, the camper comprising:

a camper top disposed above the two sidewalls and the front wall of the truck, said camper top being movable between a lowered position in which said top is adjacent the upper edge of the two sidewalls and the front wall and is below the top of the truck cab and a raised position in which said top is elevated above the vehicle bed to a height above the truck cab, said camper top being operable to improve the aerodynamics of the truck when in the lowered position to reduce wind drag on the truck when moving;

main frame means for supporting said camper in the raised position being pivotally attached adjacent said sidewalls for pivotally moving between a lowered frame position for storage beneath said camper top and a raised frame position and comprising:

a frame plate extending outwardly from said main frame adjacent the lower end thereof with the plane of said frame plate being parallel to the plane in which said main frame is rotatable;

a pin;

structure for mounting said pin on said frame plate in a position perpendicular to said plate;

a skid plate mounted adjacent said main frame means and being inclined relative to said frame plate;

a spring for biasing said pin towards said skid plate;

an aperture disposed adjacent the end of said skid plate for receiving said pin to lock said main frame in the raised frame position; and said pin being adapted to engage said skid plate as said main frame is rotated from the lowered to the raised frame position with the skid plate forcing the pin to move axially against the bias of said spring until the pin is aligned with said aperture whereupon said spring forces said pin into said aperture to lock said main frame in the raised frame position;

a pair of camper beds movable between a closed position and an open position, said camper beds being disposed above the truck bed and below the camper top in the closed position, said beds extending outwardly from the two sidewalls of the truck in the open position;

a canopy forming a tent shelter over said camper beds in an open position to provide a covered sleeping area above said camper beds; and a tent frame for supporting the canopy above said camper beds.

9. A camper mounted on a vehicle having a vehicle bed, two sidewalls and a front wall, said camper comprising:

a top covering the vehicle bed and movable between a lowered position adjacent the upper edge of the two sidewalls and the front wall and a raised position elevated above the vehicle bed;

main frame means pivotally attached adjacent said sidewalls for supporting the rigid top in the raised position and for pivotally moving between a lowered frame position and a raised frame position;
said main frame means comprising two U-shaped frames, each having two distal ends pivotally attached at pivots adjacent the upper edges of the two sidewalls and having a transverse frame member slidably attached to said rigid top;
lever means extending from said main frame means for applying a rotational force to said main frame means;
said lever means comprising a plurality of plates extending obliquely from the distal ends of said U-shaped frames and having catch means for attaching said springs to said plates, whereby said springs are operable to transmit a tension force to said plates for imparting a torque force to said U-shaped frames to urge said U-shaped frames to rotate toward the raised frame position; and
force means for applying a force to said lever means to apply a rotational force to said main frame means for urging said main frame means to rotate from the lowered frame position towards the raised frame position, and including at least one tension spring attached to said lever means for applying said rotational force to said main frame means.

10. A camper mounted on a vehicle having a vehicle bed, two sidewalls and a front wall, said camper comprising:
a top covering the vehicle bed and movable between a lowered position adjacent the upper edge of the two sidewalls and the front wall and a raised position elevated above the vehicle bed;
main frame means pivotally attached adjacent said sidewalls for supporting the rigid top in the raised position and for pivotally moving between a lowered frame position and a raised frame position;
lever means extending from said main frame means for applying a rotational force to said main frame means and comprising:
triangular plates extending from the lower end of said main frame means; and
catch means on said triangular plates disposed remotely from said main frame means for attaching said tension means to said triangular plates, whereby said tension means will impart a tension force to said triangular plates for applying a torque to said main frame means causing said main frame means to rotate toward the raised frame position; and
force means for applying a force to said lever means to apply a rotational force to said main frame means for urging said main frame means to rotate from the lowered frame position towards the raised frame position.

11. The camper of claim 10 further comprising:
apertures extending through said triangular plates;
pins dimensioned to snuggly extend through said apertures; and
lock means for engaging said pins extending through said apertures in said triangular plates for locking said triangular plates in a fixed position to lock said main frame means in the raised frame position.

12. A camper mounted on a vehicle having a vehicle bed, two sidewalls and a front wall, said camper comprising:
a top covering the vehicle bed and movable between a lowered position adjacent the upper edge of the two sidewalls and the front wall and a raised position elevated above the vehicle bed;
main frame means pivotally attached adjacent said sidewalls for supporting the rigid top in the raised position and for pivotally moving between a lowered frame position and a raised frame position;
lever means extending from said main frame means for applying a rotational force to said main frame means;
force means for applying a force to said lever means to apply a rotational force to said main frame means for urging said main frame means to rotate from the lowered frame position towards the raised frame position;
a pair of bed structures for being detachably mounted in an open position extending outwardly from the upper edge of the two sidewalls and for being slidably moved to a closed position within the two sidewalls;
fastener means for fastening the inner edge of each bed structure adjacent the upper edge of the sidewalls in the open position comprising:
a plurality of bed apertures disposed adjacent the inner edge of each said bed structure;
a plurality of bed pins dimensioned to snuggly extend through said bed apertures; and
receiving structure attached to said sidewalls and having a plurality of apertures dimensioned to receive said pins to fasten said bed structures in the open position;
bed support means for vertically supporting said bed structures in the open position;
at least one cross member extending between the two sidewalls above the vehicle bed for supporting said bed structures above the vehicle bed in the closed position to form a storage area above the vehicle bed and beneath the bed structures;
a canopy extending from the outer edge of said rigid top and disposed above and along the edges of said bed structures in the open position to form a tent enclosing a living area above the vehicle bed and the bed structures in the open position; and
a tent frame for supporting said canopy above said bed structures.

13. A camper mounted on a vehicle having a vehicle bed, two sidewalls and a front wall, said camper comprising:
a top covering the vehicle bed and movable between a lowered position adjacent the upper edge of the two sidewalls and the front wall and a raised position elevated above the vehicle bed;
main frame means pivotally attached adjacent said sidewalls for supporting the rigid top in the raised position and for pivotally moving between a lowered frame position and a raised frame position;
lever means extending from said main frame means for applying a rotational force to said main frame means; and
force means for applying a force to said lever means to apply a rotational force to said main frame means for urging said main frame means to rotate from the lowered frame position towards the raised frame position comprising:
a plurality of elongate inelastic members attached to said lever means for transmitting a tension force to said lever means; and
a gear and crank mechanism for placing a tension force on said elongate members.

14. A camper mounted on a vehicle having at least a vehicle bed, two sidewalls and a front wall, said camper comprising:
- a rigid top covering the vehicle bed and movable between a lowered position adjacent the upper edge of the two sidewalls and the front wall, and a raised position elevated above the vehicle bed;
- main frame means attached adjacent the sidewalls and attached to the rigid top for supporting the rigid top in a raised position and for moving between a lowered frame position and a raised frame position;
- a pair of movable beds for being detachably mounted in an open position extending outwardly from the upper edges of the two sidewalls and for being moved to a closed position within the two sidewalls;
- bed support means for vertically supporting said movable beds in the open position;
- fastener means for fastening the inner edges of said movable beds in the open position adjacent the upper edge of the sidewalls and for releasing said movable beds for removal from the vehicle and camper comprising:
  - a plurality of bed apertures adjacent the inner edges of said movable beds;
  - a plurality of bed pins dimensioned to snuggly extend through said bed apertures; and
  - receiving structure attached to the sidewalls and having a plurality of apertures dimensioned to receive said bed pins to fasten said movable beds in the open position;
- a canopy extends from the outer edge of the rigid top and disposed above and along the edges of the movable beds in the open position to form a tent shelter enclosing a living area above the movable beds in an open position and between the rigid top and the vehicle bed; and
- a tent frame for supporting the canopy above the movable beds.

15. A camper mounted on a vehicle having at least a vehicle bed, two sidewalls and a front wall, said camper comprising:
- a rigid top covering the vehicle bed and movable between a lowered position adjacent the upper edge of the two sidewalls and the front wall, and a raised position elevated above the vehicle bed;
- main frame means attached adjacent the sidewalls and attached to the rigid top for supporting the rigid top in a raised position and for moving between a lowered frame position and a raised frame position;
- a pair of movable beds for being detachably mounted in an open position extending outwardly from the upper edges of the two sidewalls and for being moved to a closed position within the two sidewalls;
- bed support means for vertically supporting said movable beds in the open position;
- fastener means for fastening the inner edges of said movable beds in the open position adjacent the upper edge of the sidewalls and for releasing said movable beds for removal from the vehicle and camper;
- a canopy extending from the outer edge of the rigid top and disposed above and along the edges of the movable beds in the open position to form a tent shelter enclosing a living area above the movable beds in an open position and between the rigid top and the vehicle bed;
- a tent frame for supporting the canopy above the movable beds; and
- a plurality of rods for extending between the two sidewalls above the vehicle bed for supporting said movable beds above the vehicle bed in the closed position to form a storage area beneath said movable beds and above the vehicle bed.

16. A camper mounted on a vehicle having at least a vehicle bed, two sidewalls and a front wall, said camper comprising:
- a rigid top covering the vehicle bed and movable between a lowered position adjacent the upper edge of the two sidewalls and the front wall, and a raised position elevated above the vehicle bed;
- main frame means attached adjacent the sidewalls and attached to the rigid top for supporting the rigid top in a raised position and for moving between a lowered frame position and a raised frame position;
- a pair of movable beds for being detachably mounted in an open position extending outwardly from the upper edges of the two sidewalls and for being moved to a closed position within the two sidewalls;
- bed support means for vertically supporting said movable beds in the open position;
- fastener means for fastening the inner edges of said movable beds in the open position adjacent the upper edge of the sidewalls and for releasing said movable beds for removal from the vehicle and camper;
- a canopy extending from the outer edge of the rigid top and disposed above and along the edges of the movable beds in the open position to form a tent shelter enclosing a living area above the movable beds in an open position and between the rigid top and the vehicle bed; and
- a tent frame for supporting the canopy above the movable beds comprising:
  - a pair of rectangular frames attached along the length of the outer edges of said movable beds and movable between an upright position and a flat position against said movable beds; and
  - a pair of piano hinges for hingedly attaching the rectangular frames to the outer edges of said movable beds, said rectangular frames being operable through said piano hinges to rigidify and strengthen said movable beds to prevent lengthwise bowing.

17. In a camper mounted on a vehicle having at least a vehicle bed, two sidewalls and a front wall, the said camper having a rear frame means pivotally attached adjacent the rear ends of the upper edges of the sidewalls, a front frame means pivotally attached adjacent the front ends of the upper edges of the sidewalls for rotation about a pivot, and a rigid top supported by the front and rear frame means and movable between a raised position and a lowered position, the improvement in said camper comprising:
- fastener means for fastening the front end of the rigid top in a lowered position, said fastener means being operable to engage when the front end of the rigid top is in a lowered position and the rear end of the rigid top is in a raised position and to apply a downward force on the rigid top when the rear end of the rigid top is moved from a raised to a lowered position said fastener means comprising:

one plate attached to and extending obliquely from said front frame means;

one cable having first and second ends; first means for fixedly attaching the first end of said cable adjacent the upper edge of one of the sidewalls at a position remote from said plate;

second means for detachably securing the second end of said cable to the front edge of the rigid top when the rigid top is disposed adjacent the front wall;

a guide means mounted on said plate means for slidably enclosing a portion of said cable and being movable through an arc about the pivot of the front frame means; and said guide means being operable when the front edge of the rigid top is lowered adjacent the front wall to move through an arc as the rear end of said rigid top is moved from a raised position to a lowered position to tension said cable means for securing the front end of the rigid top in a closed position adjacent the front wall.

18. The improvement of claim 17 wherein said fastener means comprises:

at least one bar secured in a spaced apart relationship along the top edge of the front wall; and at least one prong extending from the lower front edge of the rigid top, said prong being adapted for insertion beneath said bar when the front end of the rigid top is in a lowered position and the rear end thereof is in a raised position, said prong being further adapted to lock against said bar and to exert an upward force on said bar to force the front end of said rigid top into a tightly spaced relationship with said front wall when the rear end of the rigid top is in a lowered position.

19. A camper mounted on a vehicle having a vehicle bed, two sidewalls and a front wall, said camper comprising:

a top covering the vehicle bed and movable between a lowered position adjacent the upper edge of the two sidewalls and the front wall and a raised position elevated above the vehicle bed;

main frame means pivotally attached adjacent said sidewalls for supporting the rigid top in the raised position and for pivotally moving between a lowered frame position and a raised frame position;

lever means extending from said main frame means for applying a rotational force to said main frame means;

force means for applying a force to said lever means to apply a rotational force to said main frame means for urging said main frame means to rotate from the lowered frame position towards the raised frame position;

a pair of bed structures attached adjacent the upper edge of each of the sidewalls for rotating between a closed position within the sidewalls to an open position with said bed structures extending outwardly from the sidewalls;

hinge means for attaching said bed support structure adjacent the upper edge of the sidewall;

a canopy extending from the outer edge of said rigid top and disposed above and along the edge of said bed structures in the open position to form a tent shelter enclosing a living area above said bed structures in an open position and between the rigid top and the vehicle bed;

a tent frame for supporting the canopy above the bed structures;

a slideway extending along the outer edges of said rigid top and having an interior channel with a longitudinal slot extending between said interior channel and the exterior of the slideway; and said canopy having a cord shaped portion extending along the edge of said canopy dimensioned to snuggly fit within said channel for insertion into said channel with said canopy extending through said slot to attach said canopy to said rigid top.

20. A camper mounted on a vehicle having a vehicle bed, two sidewalls and a front wall, said camper comprising:

a top covering the vehicle bed and movable between a lowered position adjacent the upper edge of the two sidewalls and the front wall and a raised position elevated above the vehicle bed;

main frame means pivotally attached adjacent said sidewalls for supporting the rigid top in the raised position and for pivotally moving between a lowered frame position and a raised frame position;

lever means extending from said main frame means for applying a rotational force to said main frame means;

force means for applying a force to said lever means to apply a rotational force to said main frame means for urging said main frame means to rotate from the lowered frame position towards the raised frame position;

a pair of bed structures for being detachably mounted in an open position extending outwardly from the upper edge of the two sidewalls and for being slidably moved to a closed position within the two sidewalls;

fastener means for fastening the inner edge of each bed board adjacent the upper edge of the sidewalls in the open position;

bed support means for vertically supporting said bed structures in the open position;

at least one cross member extending between the two sidewalls above the vehicle bed for supporting said bed structures above the vehicle bed in the closed position to form a storage area above the vehicle bed and beneath the bed structures;

a canopy extending from the outer edge of said rigid top and disposed above and along the edges of said bed structures in the open position to form a tent enclosing a living area above the vehicle bed and the bed structures in the open position;

a tent frame for supporting said canopy above said bed structures;

a slideway extending along the outer edges of said rigid top and having an interior channel with a longitudinal slot extending between said interior channel and the exterior of the slideway; and said canopy having a cord shaped portion extending along the edge of said canopy dimensioned to snuggly fit within said channel for insertion into said channel with said canopy extending through said slot to attach said canopy to said rigid top.

21. A camper mounted on a vehicle having a vehicle bed, two sidewalls and a front wall, said camper comprising:

a top covering the vehicle bed and movable between a lowered position adjacent the upper edge of the two sidewalls and the front wall and a raised position elevated above the vehicle bed;

main frame means pivotally attached adjacent said sidewalls for supporting the rigid top in the raised position and for pivotally moving between a lowered frame position and a raised frame position;

lever means extending from said main frame means for applying a rotational force to said main frame means;

force means for applying a force to said lever means to apply a rotational force to said main frame means for urging said main frame means to rotate from the lowered frame position towards the raised frame position;

a pair of bed structures attached adjacent the upper edge of each of the sidewalls for rotating between a closed position within the sidewalls to an open position with said bed structures extending outwardly from the sidewalls;

hinge means for attaching said bed support structure adjacent the upper edge of the sidewall;

a canopy exending from the outer edge of said rigid top and disposed above and along the edge of said bed structures in the open position to form a tent shelter enclosing a living area above said bed structures in an open position and between the rigid top and the vehicle bed;

a tent frame for supporting the canopy above the bed structures;

a pair of generally upright rectangular frames attached to the outer edges of said bed structures in an open position;

a plurality of telescoping tent rods extending between the upper edge of said rectangular frames in the upright position and the outer edge of said rigid top in the raised position for supporting said canopy above said bed structures;

a plurality of apertured structures mounted along the outer edge of said rigid top and the upper edges of said rectangular frames for receiving opposing ends of said telescoping tent rods; and springs mounted within said telescoping tent rods to urge the opposing ends of said telescoping tent rods in opposite directions against said apertured structures to secure said telescoping tent rods between said rigid top and said rectangular frames.

22. A camper mounted on a vehicle having a vehicle bed, two sidewalls and a front wall, said camper comprising:

a top covering the vehicle bed and movable between a lowered position adjacent the upper edge of the two sidewalls and the front wall and a raised position elevated above the vehicle bed;

main frame means pivotally attached adjacent said sidewalls for supporting the rigid top in the raised position and for pivotally moving between a lowered frame position and a raised frame position;

lever means extending from said main frame means for applying a rotational force to said main frame means; and force means for applying a force to said lever means to apply a rotational force to said main frame means for urging said main frame means to rotate from the lowered frame position towards the raised frame position;

a pair of bed structures for being detachably mounted in an open position extending outwardly from the upper edge of the two sidewalls and for being slidably moved to a closed position within the two sidewalls;

fastener means for fastening the inner edge of each bed board adjacent the upper edge of the sidewalls in the open position;

bed support means for vertically supporting said bed structures in the open position;

at least one cross member extending between the two sidewalls above the vehicle bed for supporting said bed structures above the vehicle bed in the closed position to form a storage area above the vehicle bed and beneath the bed structures;

a canopy extending from the outer edge of said rigid top and disposed above and along the edge of said bed structures in the open position to form a tent enclosing a living area above the vehicle bed and the bed structures in the open position; and a tent frame for supporting said canopy above said bed structures;

a pair of generally upright rectangular frames attached to the outer edges of said bed structures in an open position;

a plurality of telescoping tent rods extending between the upper edge of said rectangular frames in the upright position and the outer edge of said rigid top in the raised position for supporting said canopy above said bed structures;

a plurality of apertured structures mounted along the outer edge of said rigid top and the upper edges of said rectangular frames for receiving opposing ends of said telescoping tent rods; and springs mounted within said telescoping tent rods to urge the opposing ends of said telescoping tent rods in opposite directions against said apertured structures to secure said telescoping tent rods between said rigid top and said rectangular frames.

23. The camper of claim 21 or 22 further comprising at least one pair of opposed apertured flanges mounted on the underside of said rigid top for mounting and storing said telescoping tent rods between said apertured flanges.

* * * * *

UNITED STATES PATENT AND TRADEMARK OFFICE
CERTIFICATE OF CORRECTION

PATENT NO. : 4,294,484
DATED : October 13, 1981
INVENTOR(S) : Robert H. Robertson It is certified that error appears in the above-identified patent and that said Letters Patent are hereby corrected as shown below:

Col. 15, line 67, "ajacent" should be --adjacent--.

Col. 21, line 33, "extends" should be --extending--.

Signed and Sealed this

Second Day of February 1982

|SEAL|

Attest:

GERALD J. MOSSINGHOFF

Attesting Officer     Commissioner of Patents and Trademarks